United States Patent [19]

Smola

[11] 4,030,183
[45] June 21, 1977

[54] TOOL ASSEMBLY FOR MOUNTING AND REMOVING OVERHUNG ROLLS

[75] Inventor: Raymond L. Smola, Holden, Mass.

[73] Assignee: Morgan Construction Company, Worcester, Mass.

[22] Filed: Feb. 2, 1976

[21] Appl. No.: 654,219

[52] U.S. Cl. .................................. 29/252; 29/244
[51] Int. Cl.² ........................................ B23P 19/02
[58] Field of Search ............ 29/252, 244, 267, 282, 29/200 H, 200 R, 427

[56] References Cited

UNITED STATES PATENTS

| | | | |
|---|---|---|---|
| 1,777,616 | 10/1930 | Hommel | 29/252 |
| 2,421,276 | 5/1947 | Lotz | 29/244 |
| 2,438,642 | 3/1948 | Martin | 29/252 |
| 2,651,836 | 9/1953 | Wallenius | 29/252 |
| 3,166,834 | 1/1965 | Newman | 29/234 |
| 3,404,448 | 10/1968 | Schonfeld | 29/252 |
| 3,654,685 | 4/1972 | Shiflet | 29/252 |
| 3,803,691 | 4/1974 | Geese et al. | 29/148.4 D |
| 3,916,499 | 11/1975 | Frame et al. | 29/252 |

Primary Examiner—C.W. Lanham
Assistant Examiner—Daniel C. Crane
Attorney, Agent, or Firm—Thompson, Birch, Gauthier & Samuels

[57] ABSTRACT

For use in combination with a work roll mounted on the end section of a shaft by means of a sleeve member axially inserted in a wedged operative position therebetween, a fluid actuated tool assembly removably engageable with the shaft and sleeve member for axially moving the sleeve member into and out of its operative position. The tool assembly preferably comprises a piston contained in a cylinder which during use is movable axially relative to the piston. At a first end of the tool assembly, the piston is removably attachable to the shaft and the cylinder is arranged to abut the sleeve. At an opposite second end of the tool assembly, the cylinder is removably attachable to the sleeve, and the piston is arranged to abut the shaft. The piston and cylinder have cooperating internal surfaces arranged to define a chamber adapted to receive fluid under pressure, the said fluid pressure being operative to move the cylinder relative to the piston. Depending on which end of the tool assembly is being used, the aforementioned cylinder movement will produce a corresponding movement of the sleeve member into or out of its operative position between the shaft and the work roll.

14 Claims, 6 Drawing Figures

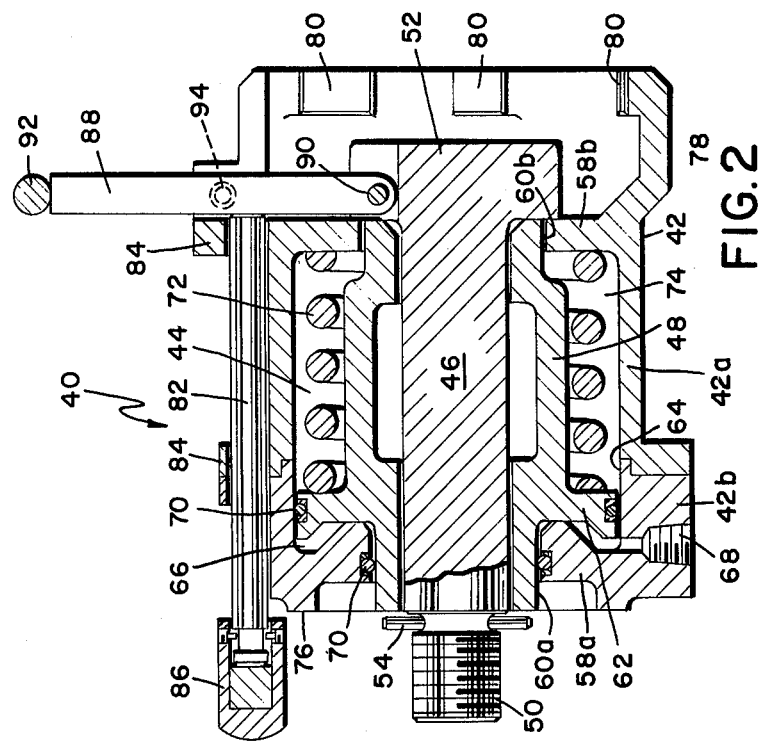
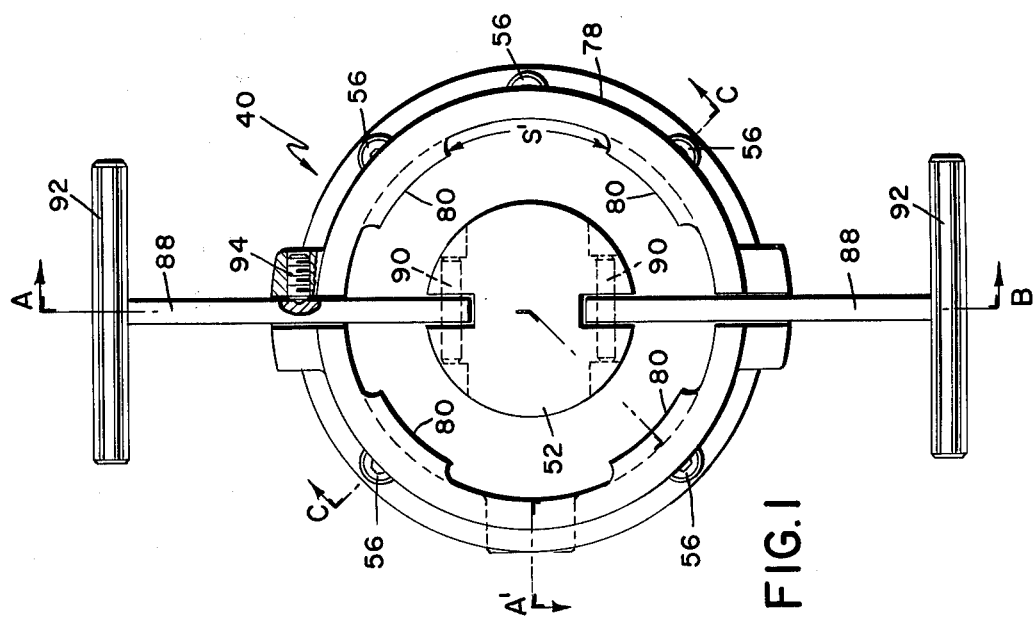

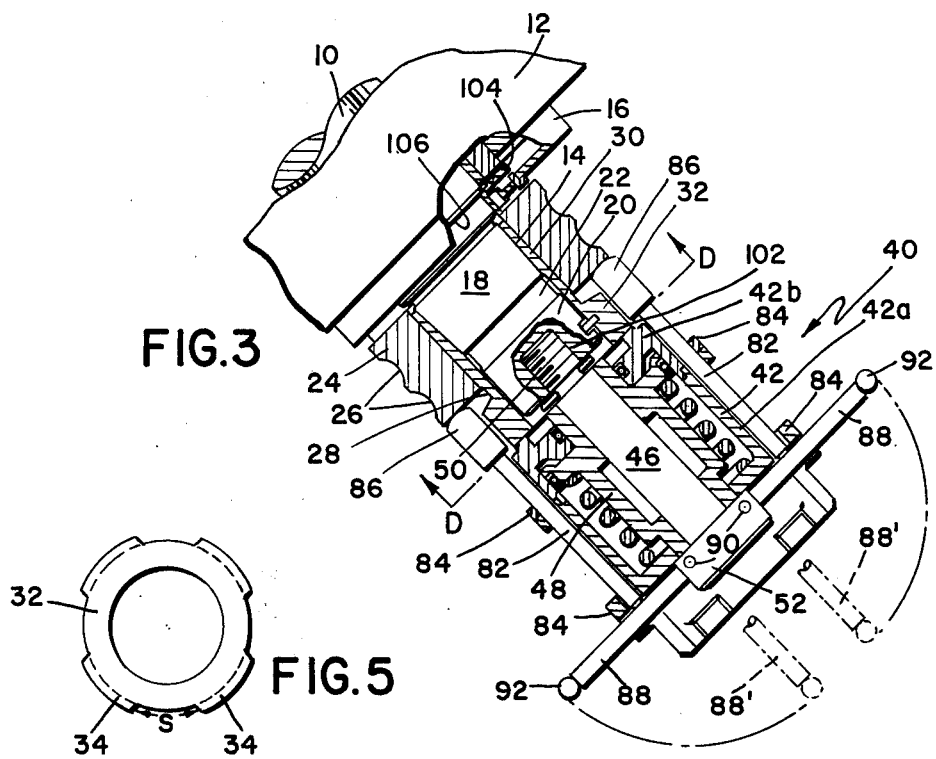
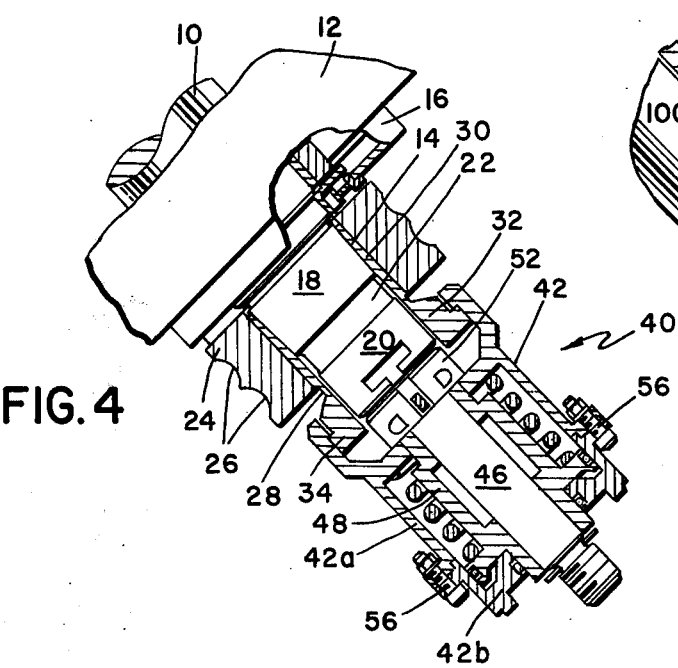

TOOL ASSEMBLY FOR MOUNTING AND REMOVING OVERHUNG ROLLS

BACKGROUND OF THE INVENTION

This invention relates generally to rolling mills where disc-type work rolls are mounted in an "overhung" or "cantilevered" fashion on the end sections of roll shafts. In arrangements of this type, it is common practice to mount the work rolls on the shaft end sections by means of sleeve members axially inserted in wedged operative positions therebetween. The insertion and removal of such sleeve members requires considerable axial force, which heretofore has been supplied by various known tool assemblies such as for example those described and claimed in U.S. Pat. No. 3,803,691.

Although these known tool assemblies operate in a generally satisfactory manner, a number of problems are associated with their use. For example, the known tool assemblies require separate multiple components, some being employed only when mounting the roll, and others being employed only when removing the roll. Tools having multiple alternately usable separate components are of course expensive. Moreover, such tools are characteristically awkward to handle, and the separate components are prone to being mislaid or lost when not in use. Also, the need to employ special components for roll mounting, and other special components for roll removal, unduly complicates the responsibility of operating personnel, particularly in rolling mills where roll removal and remounting must be accomplished as quickly as possible in order to minimize unproductive mill down time.

SUMMARY OF THE INVENTION

The present invention has as its general objective the provision of an improved fluid-actuated tool assembly which is integrally constructed as a single unit, and which is usable for both mounting and removing work rolls of the above-described type. The hydraulically actuated tool assembly of the present invention comprises a piston contained in a cylinder, with the latter being movable axially relative to the former during use. The piston and cylinder are integrally connected to provide an assembly having oppositely disposed first and second ends. At the first end of the tool assembly, the piston is removably attachable to the roll shaft, and the cylinder is arranged to abut the sleeve member. Preferably, the piston comprises inner and outer relatively rotatable components, with the inner component at the first end of the tool assembly being adapted to be threadedly attached to the shaft.

At the second end of the tool assembly, the cylinder is removably attachable to the sleeve member, and the piston is arranged to abut the roll shaft. Preferably, removable attachment of the cylinder to the sleeve member is accomplished by the interlocked engagement of radial circumferentially spaced lugs on both the cylinder and the sleeve member.

The piston and cylinder have cooperating internal surfaces arranged to define a chamber into which fluid under pressure is admitted. The fluid pressure in the chamber acts to move the cylinder axially relative to the piston and depending on which end of the tool assembly is being used to act on the sleeve member and shaft, the cylinder movement will produce a corresponding movement of the sleeve member in the desired direction, either into or out of its operative position between the roll shaft and the work roll. Typically, the first end of the tool assembly will be employed to push the sleeve member into its operative position, whereas the opposite or second end of the tool assembly will be used to pull or extract the sleeve member from its operative position. It will thus be seen that the present invention contemplates a single integrally constructed fluid-actuated tool assembly having alternately usable ends, one for inserting the sleeve member and the other for inserting the sleeve member and the other for extracting the sleeve member.

BRIEF DESCRIPTION OF THE DRAWINGS

FIG. 1 is an end view, with portions broken away, of a preferred embodiment of a fluid-actuated tool assembly in accordance with the present invention;

FIG. 2 is a sectional view taken along line A–A' of FIG. 1;

FIG. 3 is a sectional view on a reduced scale taken along line A–B of FIG. 1, showing the tool assembly in use during a roll mounting operation;

FIG. 4 is another sectional view on a reduced scale taken along line C—C of FIG. 1 showing the tool assembly in use during a roll removal operation;

FIG. 5 is an end view on an enlarged scale of the sleeve member taken along line D—D of FIG. 3; and FIG. 6 is a partial enlarged sectional view showing the means for preventing accidental dislocation of the sleeve member from the shaft during roll mounting and removal.

DESCRIPTION OF PREFERRED EMBODIMENT

Referring now to the drawings wherein like numbers designate like parts throughout the several views, and with initial reference to FIGS. 3 and 4, there is shown at 10 a roll shaft typically journalled for rotation in a housing 12. Although not shown, it will be understood that the roll shaft 10 is journalled by bearings and connected to a drive, all contained in the housing 12. The shaft 10 has an end section 14 which protrudes axially through a housing end plate 16. The shaft end section has a tapered portion 18 separated from a cylindrical portion 20 by a groove 22.

A disc type work roll 24, typically provided with multiple grooves 26, is mounted in a "cantilevered" or "overhung" fashion on the shaft end section 14. The work roll is held in place by a sleeve member 28 tapered at one end as at 30 and having a collar 32 at its opposite end. As is best shown in FIG. 5, the collar 32 has a plurality of radially outwardly extending circumferentially spaced lugs 34, with the circumferential spacing between each lug being shown typically at s. The sleeve member is adapted to be operatively positioned with its tapered end 30 wedged between the tapered portion 18 of the shaft end section 14 and the inner diameter of the work roll 24.

The components thus far described are standard and well known to those skilled in the art. The present invention is directed to the provision of a novel and improved tool assembly, generally indicated at 40, which can be employed both to insert the sleeve member 28 into its aforesaid operative position during a roll mounting operation, and to retract the sleeve member when removal of the work roll is required.

Referring additionally to FIGS. 1 and 2, it will be seen that the tool assembly 40 of the present invention comprises an outer cylinder 42 containing a piston assembly generally indicated at 44. Preferably, the piston assembly includes an inner component or piston pin 46 which extends through an outer component or piston sleeve 48. The piston pin 46 and piston sleeve 48 are relatively rotatable. The piston pin 46 has a cylindrical body section which is threaded at one end as at 50, and which has an enlarged diameter head 52 at its opposite end. The piston pin 46 extends axially through the piston sleeve 48 and is held in place by any convenient means such as for example a transversly extending small-diameter retaining pin 54.

The outer cylinder 42 is preferably made up of two mating sections 42a, 42b connected together in any convenient manner, for example by bolting as at 56. The outer cylinder has inwardly protruding annular flanges 58a, 58b, the inner edges of which slidably engage outer cylindrical surfaces 60a, 60b on th piston sleeve 48. The piston sleeve 48 is also provided with an outwardly protruding annular flange 62 which slidably engages an inner cylindrical surface 64 on the cylinder 42.

The flanges 58a and 62 have generally opposed surfaces which cooperate with the interior cylindrical surface 64 to define a chamber 66 adapted to receive pressurized fluid through an inlet 68 in cylinder section 42b. Appropriately positioned seals 70 are employed to prevent the fluid from escaping from chamber 66. A coiled spring 72 is contained between flanges 62 and 58b in the annular space 74 between piston sleeve 48 and cylinder 42. In the absence of fluid pressure in chamber 66, the spring 72 urges the flange 62 on piston sleeve 48 against the flange 58a on cylinder 42.

The tool assembly 40 has a "first" end (the left-hand end as viewed in FIG. 2) which is characterized by the threaded end 50 on the piston pin 46 and an annular end shoulder 76 on the cylinder 42. The opposite "second" end (the right-hand end viewed in FIG. 2) of the tool assembly is further characterized by the enlarged diameter head 52 on piston pin 46, and an enlarged-diameter collar 78 on cylinder 42. Collar 78 has radially inwardly extending circumferentially spaced lugs 80, with the circumferential spacing between adjacent lugs indicated typically at s' in FIG. 1.

Cylinder 42 is also preferably provided with roll locating means in the form of external pins 82 slidable in aligned guides 84. Each pin 82 has a head 86 at one end, with the opposite end being arranged to be acted upon by a lever 88 pivotally mounted to the enlarged diameter head 52 of the piston pin 46 as at 90. The levers 88 have handles 92, and are movable between inwardly disposed inoperative positions (shown in dotted at 88' in FIG. 3), and outwardly disposed operative positions shown by the solid lines in FIGS. 1–3. When operatively positioned, the levers 88 contact the ends of the pins 82 and axially move the pins towards the first end of the tool assembly. The levers 88 are retained in their operative positions by small spring-loaded detents 94.

The total assembly of the present invention is employed in the following manner:

ROLL MOUNTING

The sleeve member 28 is initially inserted into the roll 24, and the sleeve-roll combination is loosely mounted on the shaft end section 14. When this is accomplished, a small pin 96 (See FIG. 6) on the sleeve member is received through a slot 98 into a groove 100 on cylindrical shaft section 20. Once the pin is received in groove 100, the sleeve 28 is turned slightly to rotate the pin 96 out of alignment with slot 98, thereby locking the pin in groove 100. This prevents the sleeve-roll combination from falling off while the tool assembly 40 is being mounted. Thereafter, as depicted in FIG. 3, the first end of the tool assembly 40 is operatively engaged by threading the threaded end 50 of piston 46 into a threaded bore 102 in the end of the roll shaft. This can be accomplished by grasping and rotating the inoperatively positioned levers 88 without also rotating the cylinder 42 due to the fact that the piston pin 46 is rotatable relative to the piston sleeve 48. Thereafter, the levers 88 are moved to their operative positions, forcing the external pins 82 forwardly. The pins 82 act through their respective heads 86 to push the roll 24 against a spacer ring 104 which in turn abuts a locating shoulder 106 on the roll shaft 10. This insures that the roll 24 is properly located on the shaft 10 with one of the roll grooves 26 in alignment with the mill pass line. Thereafter, a suitable pressurized fluid feed line (not shown) connected to inlet 68 is employed to feed pressurized fluid into chamber 66. The fluid is preferably oil, but other fluids, including compressed air, might also be employed. When this occurs, the cylinder 42 is displaced axially relative to the piston assembly 44 in the direction of the sleeve member, thereby bringing the annular end shoulder 76 on the cylinder into contact with the end of the collar 32 on the sleeve member. The sleeve member 28 is thus pressed axially into its operative position, causing the tapered sleeve section 30 to become wedged tightly between the tapered shaft section 18 and the roll 24. With the sleeve member 28 properly seated, fluid pressure in chamber 66 is cut off, allowing spring 72 to return the piston assembly 44 to the condition shown in FIG. 2. Thereafter, the threaded end 50 of piston 46 is disengaged from the threaded bore 102 in shaft 10, and the roll mounting procedure is completed.

ROLL REMOVAL

When roll removal is required, either to replace the roll or to reverse its position in order to make use of an alternate groove 26, the second end of the tool assembly is operatively engaged, as shown in FIG. 4. This is accomplished by mechanically interlocking the lugs 80 on the collar 78 of cylinder 42 with the lugs 34 on the collar 32 of sleeve member 28. It will be understood that the circumferential spacings s and s' between the lugs 34 and 80 is such that the lugs can bypass one another, after which the cylinder 42 is rotated slightly to mechanically engage lugs 80 behind lugs 34. When this is done, the enlarged diameter head 52 on the piston pin 46 is opposite to the end of shaft 10. Pressurized fluid is then again introduced into chamber 66 via inlet 68, thus displacing the cylinder 42 axially with respect to the piston assembly 44 in a direction away from the shaft 10. The piston head 52 abuts the shaft end, and the cylinder (due to the mechanical engagement of lugs 80 with lugs 34) pulls the sleeve member 28 out of its operative wedged position between the shaft end section 14 and the work roll 24. At this stage, the sleeve member 28 is prevented from being accidentally dislocated from the shaft end section 14 by virtue of the interlocked engagement of pin 96 in groove 100. The tool assembly 40 is next disengaged, and the sleeve member 28 and roll 24 are now ready to be removed from the shaft end section 14.

In light of the foregoing, it will now be appreciated by those skilled in the art that the tool assembly 40 of the present invention offers a number of advantages not provided by previously developed arrangements. For example, all of the components of tool assembly 40 are integrally connected to provide a single compact unit. Opposite ends of the tool assembly are alternately usable when either mounting or removing a roll and its associated sleeve member. As compared with known prior art arrangements involving separate alternately usable components, the tool assembly 40 is thus easier to use and care for, and its integral single-unit construction offers important cost savings.

Having thus described a preferred embodiment of the invention, it will be apparent that design modifications can be made without departing from the spirit and scope of the appended claims. By way of example and without limitation, such design modifications might comprise different but equivalent means for connecting the first end of the piston assembly 44 to the shaft end section 14, as well as for connecting the cylinder 42 to the sleeve member 28. The roll locating pins 82 are not a strict requirement, and other equivalent means can be substituted in their place. The piston assembly 44 need not comprise multiple relatively rotatable components, although it is believed that this feature is preferable when a threaded connection is provided at the first end of the tool assembly between the piston pin and the shaft end.

It is my intention to cover these and any other modifications to the preferred embodiment herein disclosed which do not depart from the spirit and scope of the invention.

I claim:

1. For use in combination with a work roll mounted on the end section of a shaft by means of a sleeve member inserted in an operative position therebetween, a fluid-actuated tool assembly for axially moving said sleeve member relative to said shaft into and out of said operative position, said tool assembly comprising: a cylinder movable axially relative to a piston, said tool assembly having oppositely disposed first and second ends, means at said first end for removably connecting said piston to said shaft with said cylinder positioned to abut said sleeve, means at said second end for removably connecting said cylinder to said sleeve with said piston positioned to abut said shaft, surface means on said piston and said cylinder for defining a fluid chamber, and means for admitting fluid under pressure into said chamber to produce axial movement of said cylinder relative to said piston, whereupon depending on which of the aforesaid ends of said tool assembly is operatively associated with said shaft and said sleeve member, axial movement of said cylinder relative to said piston will produce a desired axial displacement of said sleeve member relative to said shaft.

2. The tool assembly as claimed in claim 1 wherein said piston at the first end of said tool assembly is threadedly engageable with said shaft.

3. The tool assembly as claimed in claim 1 wherein said cylinder at the second end of said tool assembly is provided with lug members adapted to mechanically engage lug members on said sleeve member.

4. The tool assembly as claimed in claim 1 wherein said piston is comprised of inner and outer relatively rotatable components, said inner component at the first end of said tool assembly having a threaded extension adapted to be received in a threaded bore in the end of said shaft, said inner component at the second end of said tool assembly having an enlarged diameter head adapted to abut the end of said shaft.

5. The tool assembly as claimed in claim 4 wherein said fluid chamber is defined by cooperating surface means on said cylinder and said outer component.

6. The tool assembly as claimed in claim 1 further comprising spring means for yieldingly opposing axial movement of said cylinder relative to said piston as a result of pressurized fluid being admitted through said inlet means into said chamber.

7. For use in combination with a work roll mounted on the end section of a roll shaft by means of a sleeve member axially inserted in a wedged operative position therebetween, a fluid-actuated tool assembly removably engageable with said shaft and said sleeve member for axially moving said sleeve member relative to said shaft into and out of said operative position, said tool assembly comprising: a piston contained in a cylinder which is movable axially relative to said piston, said tool assembly having oppositely disposed alternately usable first and second ends, first connecting means at the first end of said tool assembly for removably attaching said piston to said shaft with said cylinder arranged to abut said sleeve member, second connecting means at the second end of said tool assembly for removably attaching said cylinder to said sleeve member with said piston arranged to abut said shaft, cooperatively arranged surface means on said cylinder and said piston for forming a fluid chamber, said cylinder having inlet means for admitting fluid under pressure into said chamber to produce movement of said cylinder relative to said piston, whereupon, depending on which end of the tool assembly is being used, movement of said cylinder relative to said piston will produce a corresponding desired movement of said sleeve member relative to said shaft.

8. For use in combination with a shaft having an end section protruding axially from a housing and work roll mounted on said shaft end section by means of a sleeve member, said sleeve member having one end adapted for axial insertion into a wedged operative position between the shaft end section and the work roll with the opposite end of said sleeve member being exposed relative to the work roll and shaft, a fluid-actuated tool assembly for moving said sleeve member relative to said shaft into and out of said operative position, said tool assembly comprising: an external cylinder movable axially relative to an internal piston, said piston and said cylinder at a first end of said tool assembly being adapted respectively to threadedly engage said shaft and to abut the exposed end of said sleeve member, said piston and said cylinder at an opposite second end of said tool assembly being adapted respectively to abut said shaft and to mechanically engage the exposed end of said sleeve member, cooperatively arranged surface means on said piston and cylinder for defining a fluid chamber, said inlet means for admitting fluid under pressure into said chamber to produce axial movement of said cylinder relative to said piston.

9. The tool assembly as claimed in claim 8 wherein said piston is comprised of inner and outer axially arranged components, said inner component being rotatable relative to said outer component, said inner component having one end adapted to threadedly engage said shaft and having its opposite end adapted to abut said shaft end.

10. The tool assembly as claimed in claim 9 wherein said shaft end is provided with a threaded bore adapted to receive the said one end of said inner component.

11. The tool assembly as claimed in claim 8 wherein said tool assembly further includes spring means acting on said piston and cylinder to yieldingly oppose the axial force exerted by pressurized fluid admitted into said chamber through said inlet means.

12. The tool assembly as claimed in claim 8 wherein the exposed end of said sleeve member is provided with radially outwardly extending circumferentially spaced lugs, and wherein said cylinder at the second end of said tool assembly is provided with radially inwardly extending circumferentially spaced lugs adapted to mechanically engage the lugs on said sleeve member.

13. The tool assembly as claimed in claim 8 further characterized by locating means on said cylinder for contacting and moving said roll into a selected position on said shaft.

14. The tool assembly as claimed in claim 13 wherein said locating means comprises axially movable pin members carried by said cylinder, said pin members being adapted at one end to contact said work roll when said piston is threadedly engaged with said shaft, the opposite ends of said pin members being adapted to be engaged by handle members pivotally mounted on said piston.

* * * * *